US006976783B2

(12) United States Patent
Chen

(10) Patent No.: US 6,976,783 B2
(45) Date of Patent: Dec. 20, 2005

(54) ASSEMBLY METHOD AND STRUCTURE OF AN ELECTRONIC CLINICAL THERMOMETER

(75) Inventor: Sanlian Chen, Shen Chun (CN)

(73) Assignee: Actherm Inc., Hsinchu Hsien (TW)

( * ) Notice: Subject to any disclaimer, the term of this patent is extended or adjusted under 35 U.S.C. 154(b) by 0 days.

(21) Appl. No.: 10/687,586

(22) Filed: Oct. 20, 2003

(65) Prior Publication Data

US 2004/0105487 A1 Jun. 3, 2004

(30) Foreign Application Priority Data

Nov. 28, 2002 (TW) ............................... 91134572 A

(51) Int. Cl.$^7$ ........................... G01K 7/16; G01K 1/16; A61B 5/01

(52) U.S. Cl. ...................... 374/163; 374/208; 374/170; 600/474; 600/543

(58) Field of Search ................................ 374/163, 208, 374/100, 185, 170; 600/474, 300, 549

(56) References Cited

U.S. PATENT DOCUMENTS

| | | | | |
|---|---|---|---|---|
| 4,549,819 | A * | 10/1985 | Muramoto et al. | 374/178 |
| 5,013,161 | A * | 5/1991 | Zaragoza et al. | 374/208 |
| 5,232,284 | A * | 8/1993 | Egawa et al. | 374/126 |
| 5,810,617 | A * | 9/1998 | Hasagawa | 439/510 |
| 6,186,959 | B1 * | 2/2001 | Canfield et al. | 600/559 |
| 6,219,573 | B1 * | 4/2001 | Pompei | 600/474 |
| 6,227,882 | B1 * | 5/2001 | Ortega et al. | 439/101 |
| 6,250,802 | B1 * | 6/2001 | Dotan | 374/164 |
| 6,435,711 | B1 * | 8/2002 | Gerlitz | 374/130 |
| 6,572,264 | B1 * | 6/2003 | Egawa | 374/133 |
| 6,591,739 | B2 * | 7/2003 | Norcross | 99/342 |
| 6,637,935 | B2 * | 10/2003 | Chen | 374/185 |
| 6,854,880 | B2 * | 2/2005 | Hsieh | 374/163 |
| 2001/0021218 | A1 * | 9/2001 | Fukura et al. | 374/208 |
| 2002/0038075 | A1 * | 3/2002 | Tsai | 600/200 |
| 2002/0163955 | A1 * | 11/2002 | Yu | 374/208 |
| 2003/0002561 | A1 * | 1/2003 | Yu | 374/164 |
| 2003/0092971 | A1 * | 5/2003 | Intrator | 600/300 |
| 2004/0071190 | A1 * | 4/2004 | Chang | 374/185 |
| 2004/0101029 | A1 * | 5/2004 | Brunvoll | 374/163 |
| 2004/0264526 | A1 * | 12/2004 | Schrodinger | 372/38.1 |
| 2004/0264546 | A1 * | 12/2004 | Wong et al. | 374/209 |

* cited by examiner

*Primary Examiner*—Gail Verbitsky
(74) *Attorney, Agent, or Firm*—Leong C. Lei

(57) ABSTRACT

An assembly method and structure of an electronic clinical thermometer is disclosed. The thermometer can be disassembled or assembled as required, wherein one of the detachable modules such as the measuring body has an incomplete electronic clinical thermometer circuit lacking at least two elements, and these electronic elements are mounted within the other module such as the measuring probe, so that the two modules when attached together form a complete clinical thermometer.

5 Claims, 13 Drawing Sheets

ASSEMBLY METHOD AND STRUCTURE OF AN ELECTRONIC CLINICAL THERMOMETER

BACKGROUND OF THE INVENTION (a) Field of the Invention

The present invention relates to a assembly method and structure of an electronic clinical thermometer, and in particular to a clinical thermometer which can be disassembled or assembled as required, wherein one of the detachable modules such as the measuring body has an incomplete electronic clinical thermometer circuit lacking at least two elements, and these electronic elements are mounted within the other module such as the measuring probe, so that the two modules when attached together form a complete clinical thermometer for measuring the temperature of patients.

(b) Description of the Prior Art

Before the invention of electronic thermometers, mercury thermometers were widely used for measuring body temperature. Mercury will expand when subject to heat and contract when subject to cold. When in measuring, the mercury in the measuring probe will expand so that the mercury will go into a capillary tube made of glass, so enabling a user to read the temperature on the graduation of the tube. In recent years, because of the serious danger of mercury pollution to human health, electronic thermometers have been developed, and have gradually replaced the mercury thermometers.

The working principle of the electronic thermometer comprises the steps of using a counter built in the integrated circuit to count the time required for an external RC oscillation circuit composed of reference resistor and capacitor to oscillate a certain number of oscillation as the reference time, switching a temperature sensor to the above-mentioned RC oscillation circuit to carry out RC oscillation, obtaining the number of oscillation in the reference time, and then converting the number of oscillation into digital signal through the internal operation of the microprocessor, and then transmitting the digital signal to the display to show the measured temperature.

When the RC oscillation circuit composed of the reference resistor and capacitor and the RC oscillation circuit composed of the temperature sensor and the same capacitor has the same oscillation frequency as the oscillator built in the integrated circuit under a specific condition, the preset temperature value (the general preset temperature is 37° C. or 98.6° F.) in the integrated circuit is obtained. With the temperature value obtained at the time when the oscillation frequencies are the same as the basis, the other temperature values represented by the difference between the two oscillation frequencies can be calculated. As the two oscillation circuits are using the same capacitor in rotation, if it is desired to keep the temperature difference after operation within a certain range (the environmental temperature is generally preset as follows: 25° C. for the reference resistor, and 37° C. for the temperature sensor), the resistance difference between the reference resistor and the temperature sensor should also be kept at the same range. The reference resistor and the temperature sensor of the conventional electronic thermometer are fixedly mounted on the measuring circuit board, so that the resistance matching result of the reference resistor and the temperature sensor cannot be replaced.

Electronic thermometers are not easily broken and hazardous to health, and can measure accurately. Furthermore, the time required for measuring is very short. So, the conventional mercury thermometer is gradually being replaced with electronic thermometers. With the progress in scientific technology and the improvement in living standards, the electronic thermometer is relied upon by many users, and has become a common first aid item in hospitals and households.

Because of the variety of viruses and bacteria present, people are seeking more sanitary conditions at home and in hospitals, together with more accurate readings of body temperature when using thermometers. A thermometer which is used solely by one person is ideally required, in order to prevent infections being passed on from one user to another of the thermometer. The electronic thermometers currently on the market are expensive, and so cannot be disposed of after use, and must be cleaned by means of a long, complicated sterilizing procedure before being able to be safely used again. Therefore, it is an object of the present invention to provide an assembly method and structure of an electronic clinical thermometer which divides the conventional temperature measuring circuit into two detachable sub-circuits. From the working principle of the electronic thermometer mentioned above, it is understood that if only the temperature sensor is isolated as an independent member, the resistance of the temperature sensor and the resistance of the reference resistor on the circuit board cannot keep within a predetermined range. That is to say, the independent member containing the temperature sensor is non-replaceable. In order to achieve the purpose of the present invention, this independent member must include at least two electronic components, i.e. the reference resistor and the temperature sensor.

Furthermore, when the temperature measured by the conventional electronic clinical thermometer is stabilized, the thermometer will produce an illuminated signal or will activate a buzzer for notifying the user of the peak temperature. Moreover, the display of most of the-conventional thermometers does not have a backlight generator. Some conventional thermometers have a backlight generator, but the backlight generator can only give light for a very short period of time, so that when the user takes up the thermometer to read the temperature value, the backlight will be off thereby making it difficult to read the temperature and therefore causing much inconvenience in use.

Although the conventional electronic clinical thermometer is provided with a buzzer for making a humming sound to notify the user when a stabilized temperature value is obtained, the buzzer is structured with a sound case thus increasing the size of the thermometer.

Therefore, it is an object of the present invention to provide an assembly method and structure of an electronic clinical thermometer which can obviate and mitigate the above-mentioned drawbacks.

SUMMARY OF THE INVENTION

It is the primary object of the present invention to provide an assembly method of an electronic clinical thermometer which can be disassembled or assembled as required, wherein one of the detachable modules such as the measuring body has an incomplete electronic clinical thermometer circuit lacking at least two elements, and these electronic elements are mounted within the other module such as the measuring probe, so that the two modules when attached together form a complete clinical thermometer for measuring the temperature of a patient.

It is another object of the present invention to provide a structure of an electronic clinical thermometer which includes a measuring body with an incomplete electronic clinical thermometer circuit controlled by an integrated circuit and which requires at least two fewer elements (such as reference resistor and temperature sensor), and a temperature sensing device containing at least two fewer elements in the measuring body, and a connecting structure arranged between the measuring body and the temperature sensor and being conductive, so that the measuring body and the temperature sensor can be disengaged from each other or engaged together to form a complete electronic clinical thermometer.

It is still another object of the present invention to provide an electronic clinical thermometer which enables a user to read the temperature easily, and which has a backlight device to make it easier to read the temperature and a delayed circuit and a reset circuit so that when the measured temperature is stabilized, a buzzer will produce a humming sound and/or a light source will give light to notify the user of the peak temperature, and the backlight device will be activated within a predetermined period of time after the stabilized temperature is obtained thereby making it easier to read the measured temperature. If the user cannot read the temperature clearly within the time period when the backlight device is turned on, the user may press and hold the switch to activate the backlight device to give light until the switch is released and turned off.

It is a further object of the present invention to provide an electronic clinical thermometer which has a sheet-like buzzer mounted on an opening of the circuit board of the measuring body thereby eliminating the sound case of the conventional buzzer and therefore reducing the size of the thermometer.

DETAILED DESCRIPTION OF THE PRESENT INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
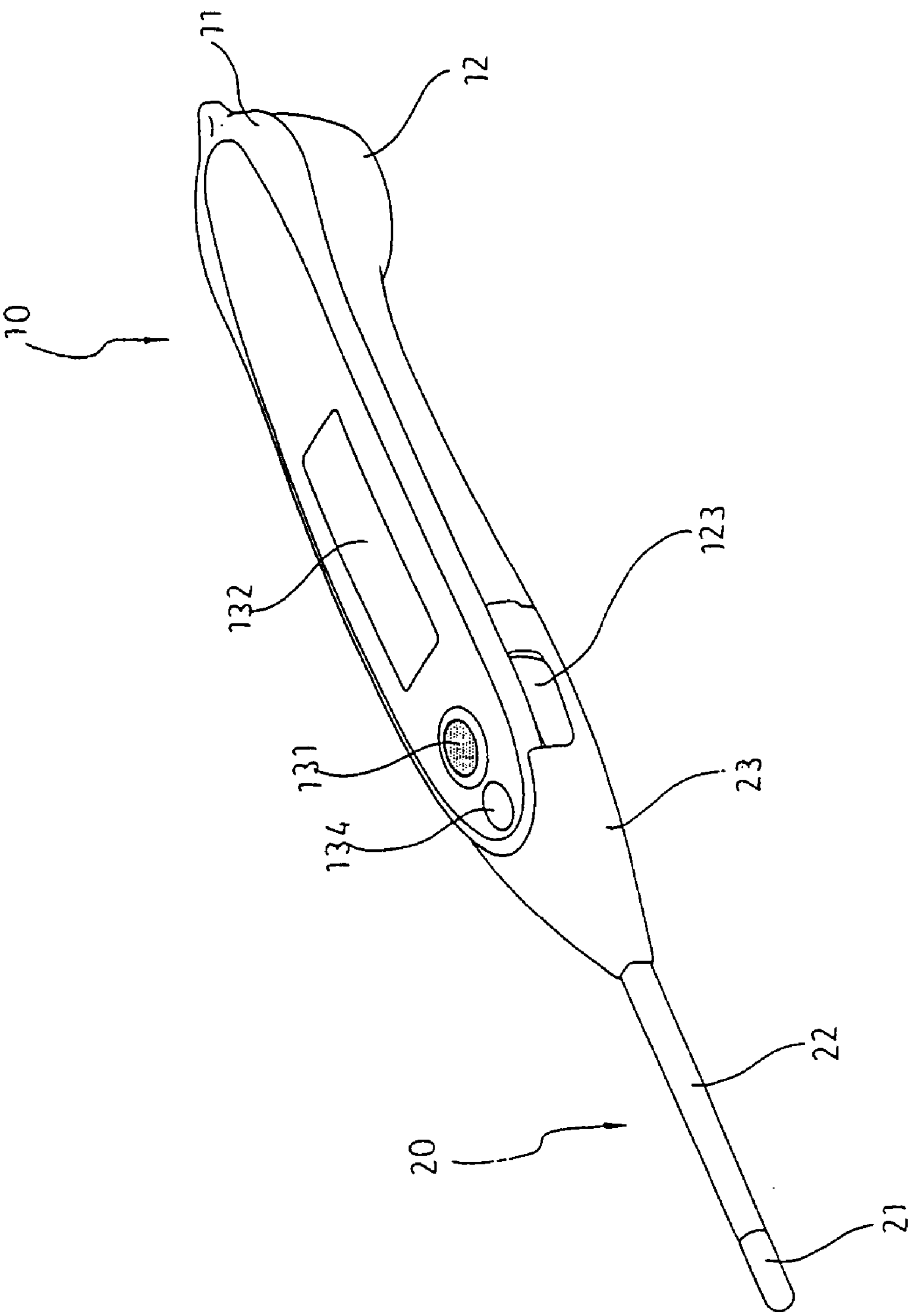
FIG. 1 is a perspective view of an electronic clinical thermometer according to the present invention.
Figure 2:
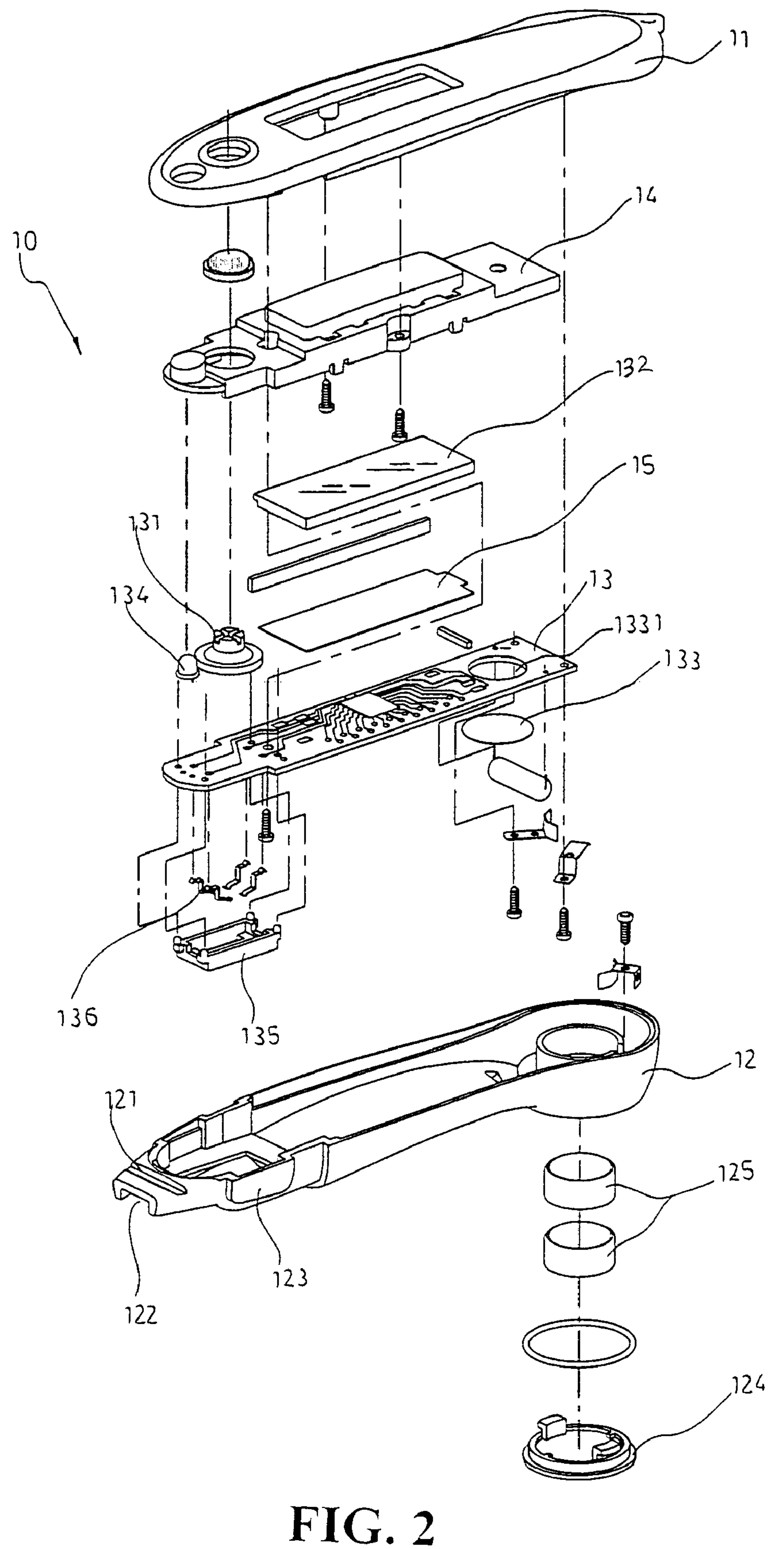
FIG. 2 is a perspective exploded view of an electronic clinical thermometer according to the present invention.
Figure 3:
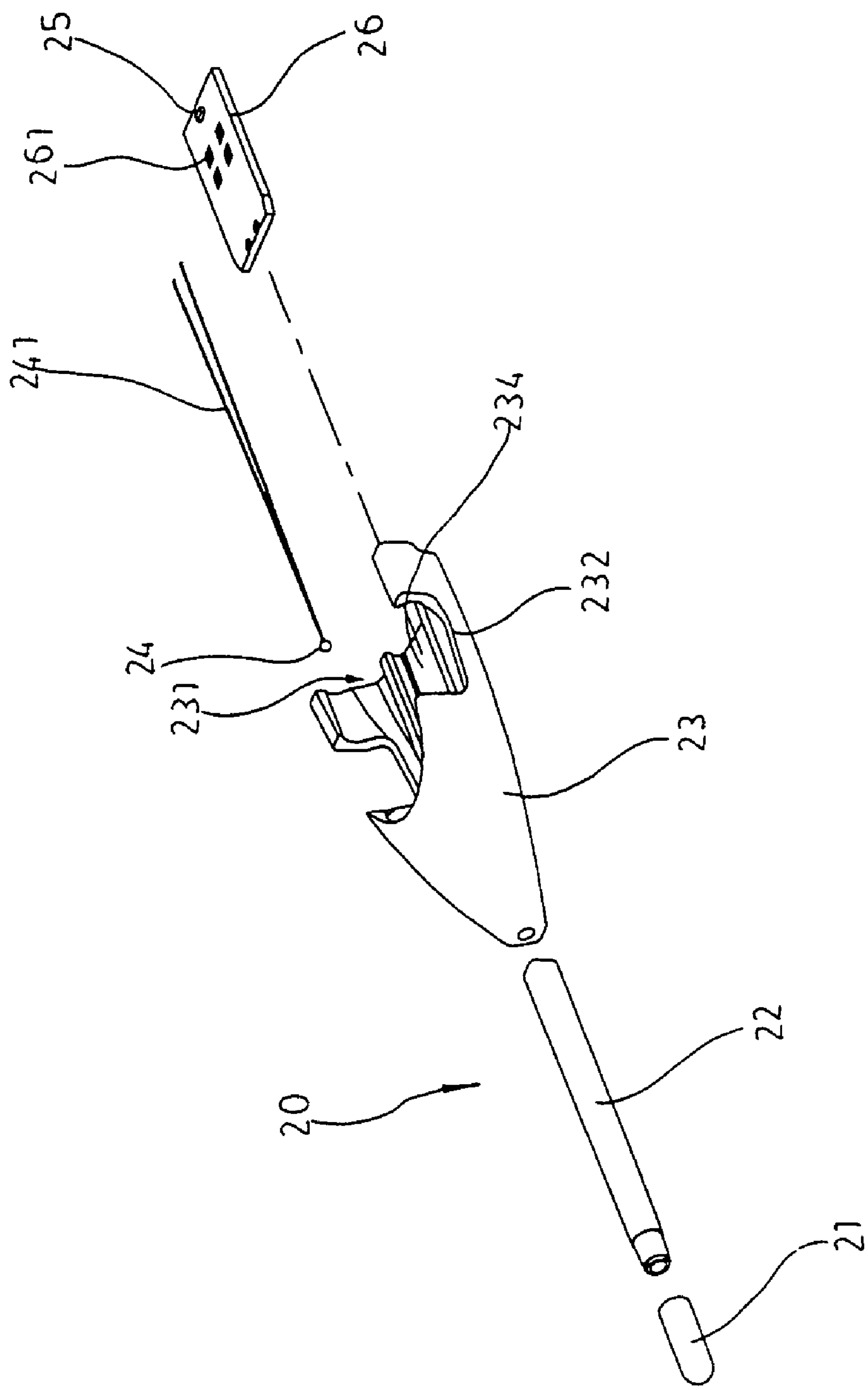
FIG. 3 is a perspective exploded view of the temperature sensor of an electronic clinical thermometer according to the present invention.

Referring to FIGS. 1, 2, and 3, the electronic clinical thermometer according to the present invention comprises two detachable modules, i.e. the measuring body 10 and the sensing device 20.

The measuring body 10 comprises a top cover 11 and a bottom cover 12 made from hard plastic material. The front section of the bottom cover 12 is formed with a slot 121 on the top and a recess 122 on the bottom. Two lateral sides of the front section of the bottom cover 12 are each formed with an engaging block 123. The bottom cover 12 is provided with a battery cover 124 for holding batteries. The measuring body 10 contains a flexible or rigid circuit board 13 and a core 14 mounted with each other for the connection with a power switch 131, a display 132 (such as an LCD), a buzer 133, and a light generator 134 (such as an LED). The switch 131 and the light generator 134 slightly protrude out of the surface of the measuring body 10. The buzzer 133 is mounted in an opening 1331 of the circuit board 13. The buzzer 133 is shaped as a sheet member and is not a conventional box-like member, thereby effectively reducing its volume. When the power is turned on, the measured temperature is stabilized, or the power is turned off, the buzzer 133 will make a humming sound and the light generator 132 will give light to notify the user. The rear of the display 132 is provided with a backlight plate 15, and the IC board 13 is provided with an incomplete electronic temperature measuring circuit (see FIG. 6) which comprises a controlling integrated circuit and externally connected electronic components, lacking at least two elements, i.e. the reference resistor and temperature sensor for use in oscillation. When the power switch 131 is turned on, due to the fact that the electronic clinical thermometer is incomplete, it is impossible to carry out temperature measurement, and the display 132 will show error such as Err. Only when incomplete circuit of the measuring body 10 is connected to the reference resistor and the temperature sensor of the sensing device 20 via a connection structure to form a complete circuit will the electronic clinical thermometer be able to measure the temperature of a patient. The measuring body 10 includes largely the measuring circuit for processing the temperature signal obtained by the sensing device 20 and converts the signal into data which is then shown in the display 132.

Figure 6:
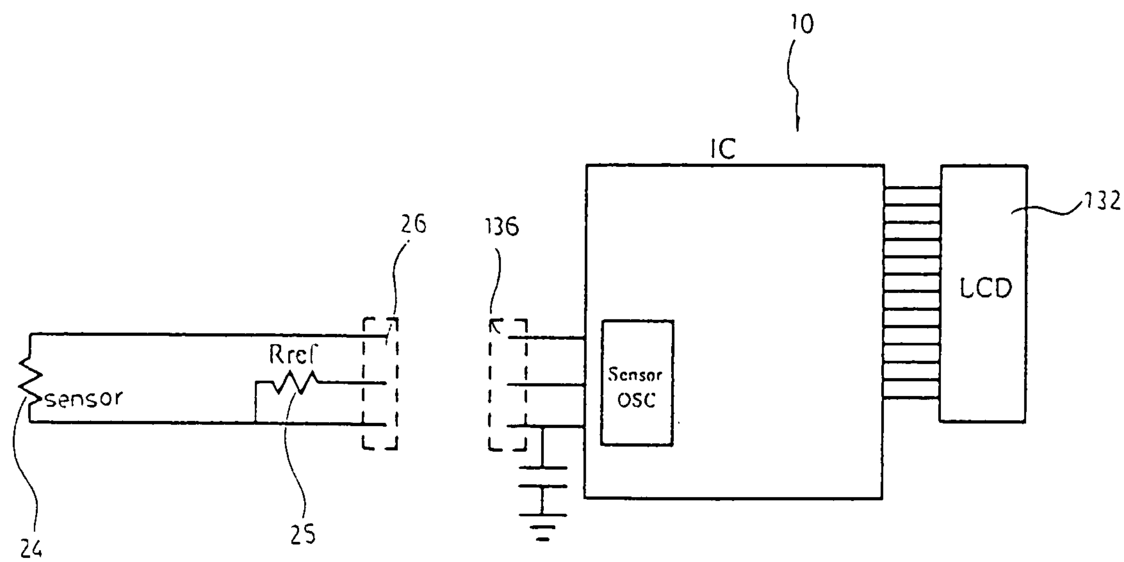
FIG. 6 is a circuit diagram of the incomplete electronic temperature measuring circuit of an electronic clinical thermometer according to the present invention.

The temperature sensing device 20 is an independent member externally formed from a hard plastic material and comprises a measuring probe 20, a temperature-sensing section 22, a connection seat 23 and at least two electronic elements containing a temperature sensor 24 and a reference resistor 25. The temperature sensor 24 and the reference resistance 25 may be a resistance matching module, wherein the resistance difference of the reference resistance 25 and the sensor 24 at a specific temperature (the general environmental temperature is set as follows: 25° C. for the reference resistor 25 and 37° C. for the temperature sensor 24) must be within a specific range. The connection seat 23 is a hollow member provided at the top with a notch 231 and at the two lateral sides with an engaging slot 232 which is configured to engage with the engaging block 232 of the bottom cover 12. The inner side of the top front portion of the connection seat 23 has a protuberance 233 adapted to engage with the slot 121 of the bottom cover 12. The temperature sensor 24 is fitted in the measuring probe 21 and the end of the conductive wire 241 of the temperature sensor 24 and other electronic elements are fixedly connected to a connector (see FIG. 6). When the sensing device 20 and the measuring body 10 are connected via a connector (as shown in FIG. 6), the incomplete measuring circuit of the measuring body 10 is connected via a metal plate to the temperature sensor 24 and the reference resistor 25 of the sensing device 20 to form into an effective complete temperature measuring circuit. At this instance, the power switch 131 is turned on automatically or manually and the thermometer is ready to proceed to measuring temperature.

The connection structure is positioned between the measuring body 10 and the sensing device 20. As shown in FIG. 2, the circuit board 13 is provided with a cap 135 for keeping a plurality of resilient conductive members 136 on the circuit board 13. The resilient conductive members 13 protrude partially out the cap 135. The connection seat 23 is formed with a sliding slot 234 for the mounting of a control board 26 having one side being connected to the conductive wire 242 of the temperature sensor 24. The surface of the control board 26 is provided with metal contacts 261 for the mounting of the reference resistor 25.

Figure 4:
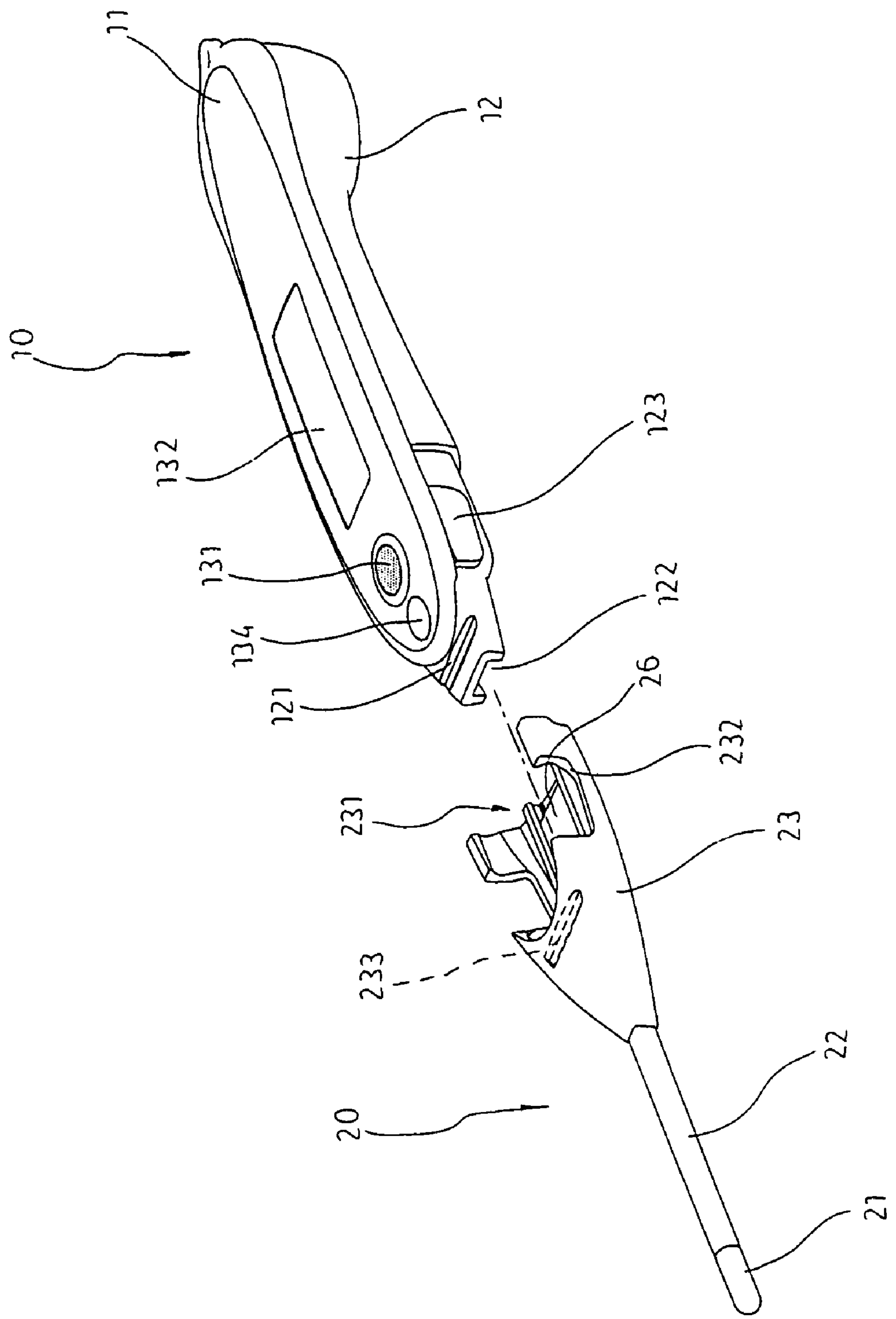
FIG. 4 is a perspective exploded view showing the separation of the measuring body with the temperature sensor of an electronic clinical thermometer according to the present invention.
Figure 5:
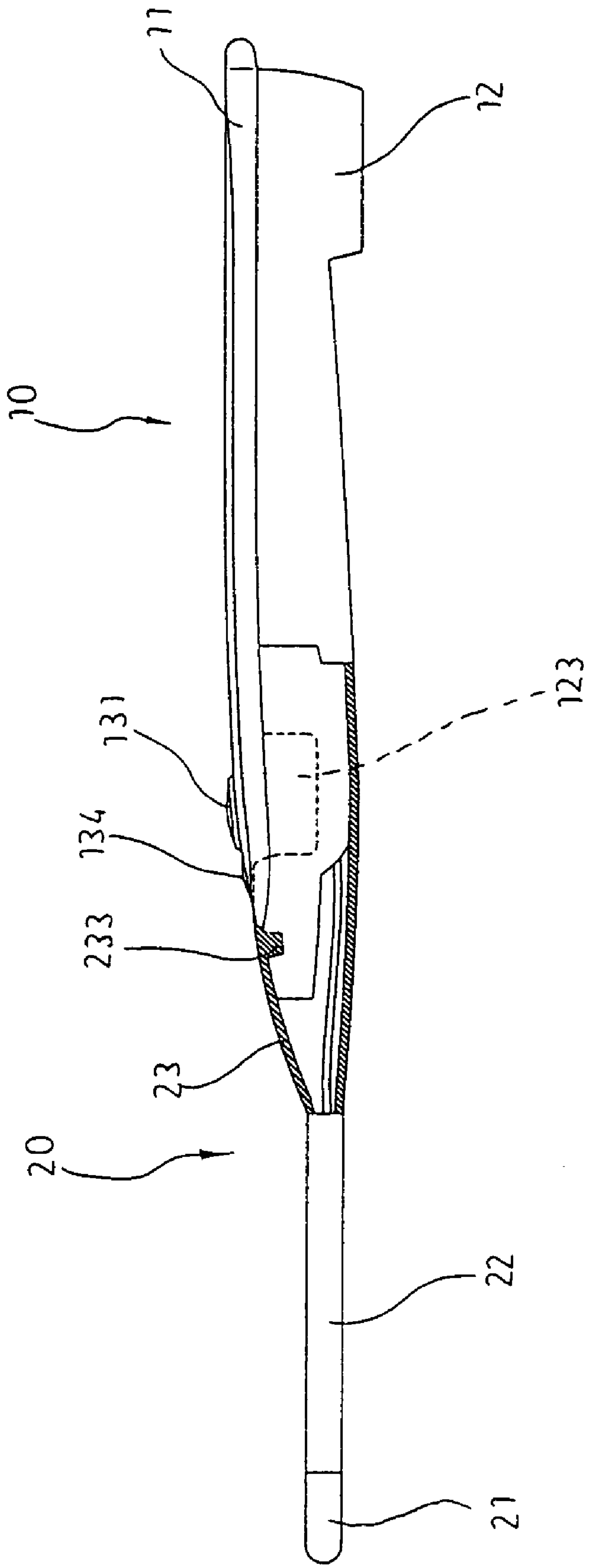
FIG. 5 is a sectional view of an electronic clinical thermometer according to the present invention.

Referring to FIGS. 4 and 5, when the sensing device 20 is connected with the measuring body 10, the engaging slot 232 of the connection seat 23 will engage with the engaging block 123 of the measuring body 10 thereby forming a complete electronic clinical thermometer. At this instance, the protuberance 233 of the connection seat 23 is engaged with the slot 121 of the measuring body 10 so that the sensing device 20 will not be dislocated after the connection with the measuring body 10.

Referring to FIGS. 4, 5 and 6, when the measuring body 10 is connected with the sensing device 20, the metal contacts 261 of the control board 26 will get into touch with the resilient conductive members 136 so that the incomplete electronic clinical thermometer circuit of the measuring body 10 will be connected with the reference resistor 25 and the temperature sensor 26 of the sensing device 20 to form an effective complete temperature measuring circuit with measuring error within a specific range. At this instance, when the measuring body 10 is connected with the sensing device 20, the thermometer will be triggered automatically or manually by turning on the power switch 131 to activate the electronic temperature measuring circuit to generate measuring signals until a steady temperature is obtained.

Hence, the independent measuring body 10 can be used with a plurality of temperature sensing devices 20 because the temperature sensing devices 20 are disposable and re-usable. It can be used by multiple users at home or in hospitals. The temperature sensing device 20 is a module which is easy to manufacture, low in cost, and easily sterilized, thus preventing infection.

The display 132 of the measuring body 10 is provided with a backlight plate 15 and the control circuit is provided with a delay circuit and a reset circuit, so that when the measured temperature is stabilized, the buzzer 133 will make a humming sound and the light generator 134 will give light to notify the user that a steady temperature is obtained. Within a preset time period after the steady temperature signal is obtained, the backlight plate 15 will be activated to give light for about 5 to 10 seconds. If the user cannot read the temperature clearly within that period of time, he or she may depress and hold the power switch 131 so that backlight plate 15 will give light until the power switch 131 is released and turned off The measured result of the sensing device 20 can be wirelessly transmitted to the central control system of the measuring body 10 by way of wireless. A wireless transmitter may be arranged in the sensing device 20 and a wireless transmission circuit is mounted in the incomplete electronic measuring circuit so as to transmit the measured result to the central control system In the fabrication of the electronic clinical thermometer, the resistance matching module is regarded as a unit. The resistance matching module with the reference resistor 25 and the temperature sensor 24 having a resistance difference with a specific range at a specific temperature is welded via the connection structure onto the incomplete electronic temperature measuring circuit board, such that the incomplete electronic temperature measuring circuit board is formed into an effective complete electronic temperature measuring circuit and can be mounted within the housing of the thermometer casing without adjusting the difference value thereby forming an Impact Medical Thermometer.

Figure 7:
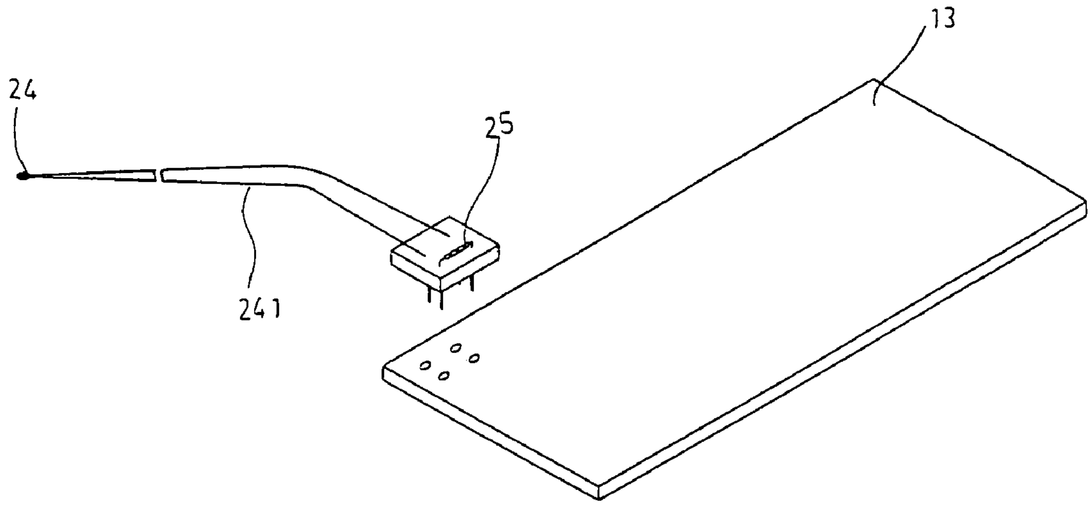
FIGS. 7 to 9 are schematic views showing the connector of preferred embodiment according to the present invention.
Figure 8:
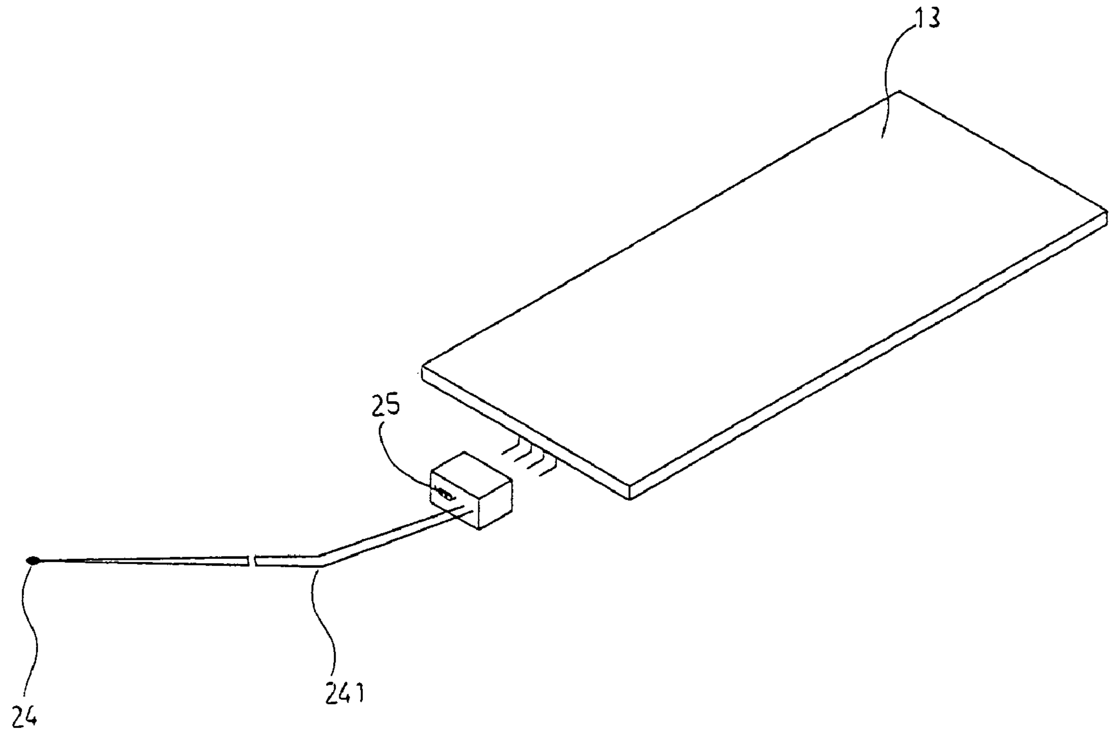
Figure 9:
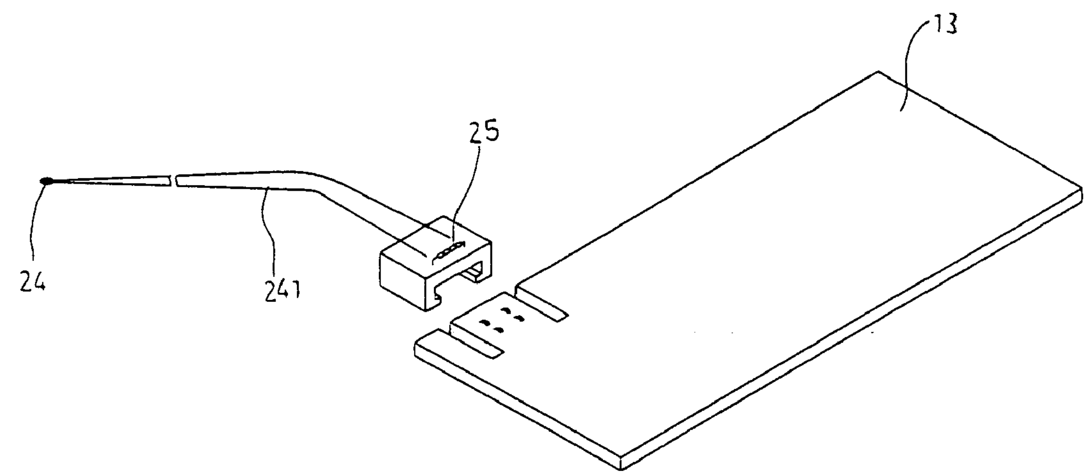
Figure 13:
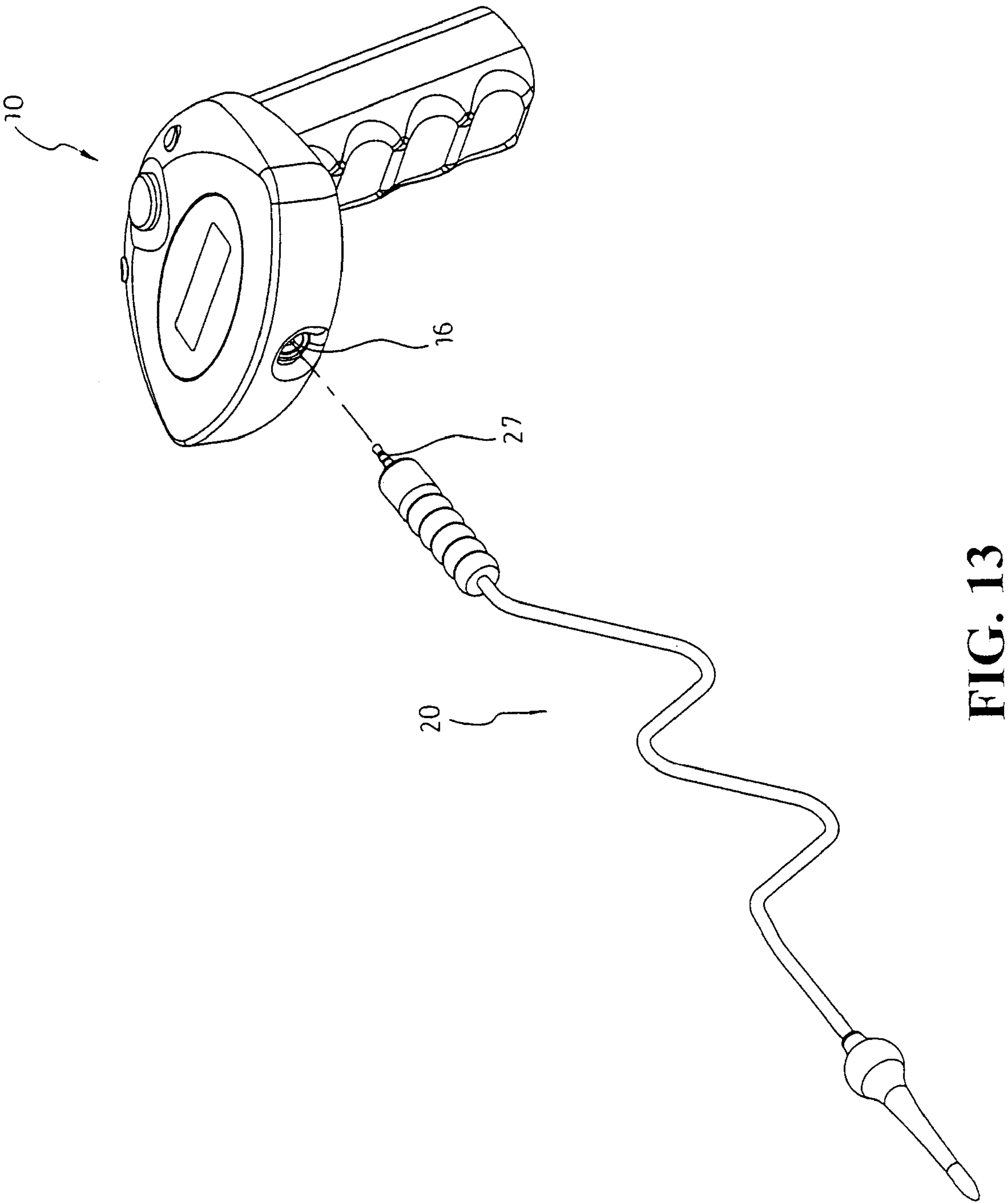
FIG. 13 is a perspective view of an electronic clinical thermometer according to the present invention.

Referring to FIGS. 7, 8, 9, the connection structure is a conductive member between the measuring body 10 and the sensing device 20. The connection structure may be a pin header to socket (see FIG. 7), an edge card to socket (see FIG. 8), a metal string to Simm card (see FIG. 9), or any other connection structure which can achieve the same conductive result. As shown in FIG. 13, the connection structure is a socket 16 and a pin 27 which can be used for current conduction and signal transmission.

Figure 10:
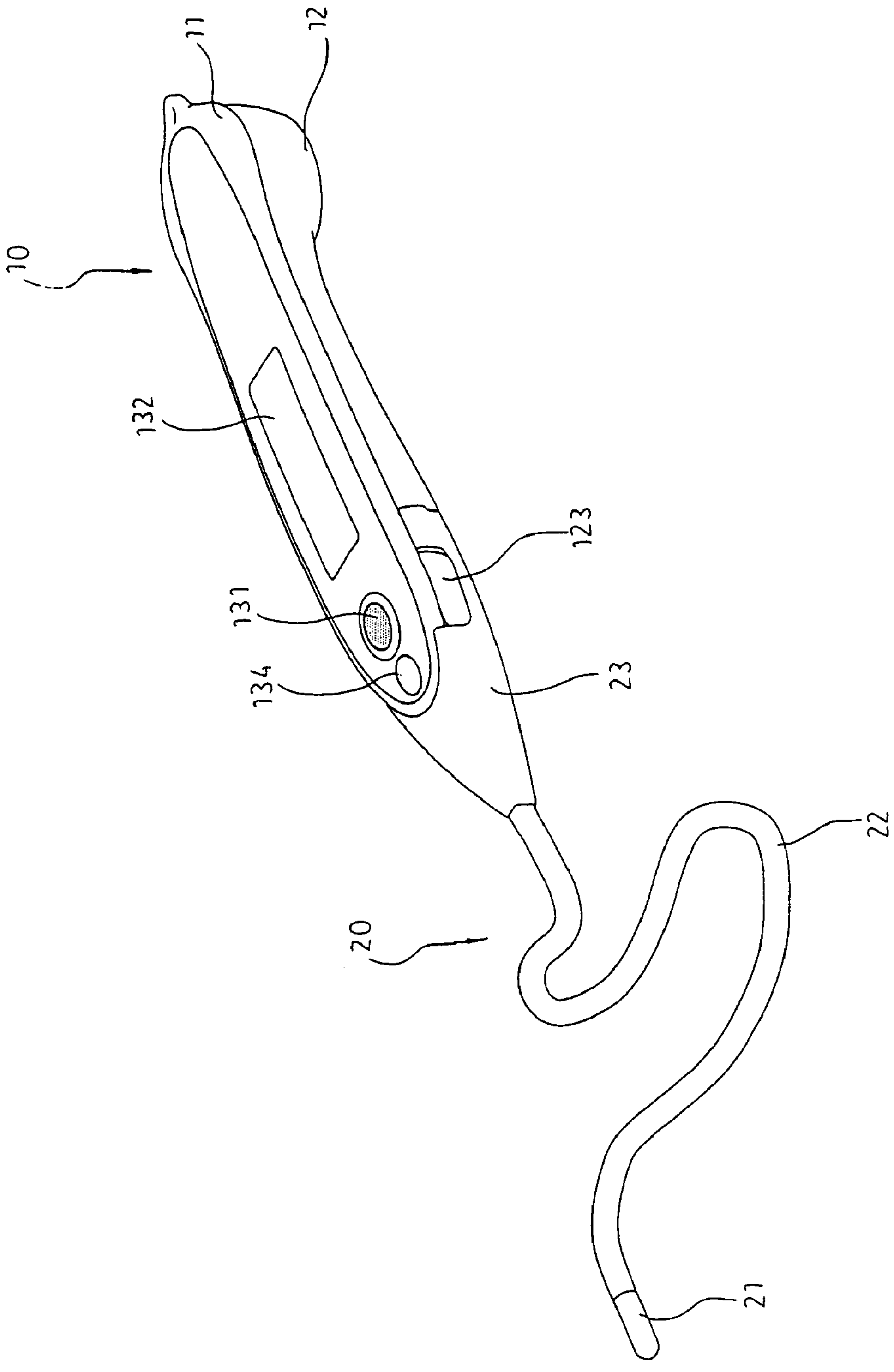
FIG. 10 is a schematic view showing the temperature sensing device of the present invention.

Referring to FIG. 10, the temperature sensing section 22 can be cleaned with hard or soft fabric material and if it is necessary to increase the length, a plastic covered wire can be used.

Referring to FIG. 10, the temperature sensing section 22 connected to the measuring probe 21 of the sensing device 20 may be made of rigid or soft material. When it is necessary to extend the length of the sensing section 22 for facilitating cleaning, sterilizing and using, the sensing section 22 may be made of a cord with plastic covering.

Figure 11:
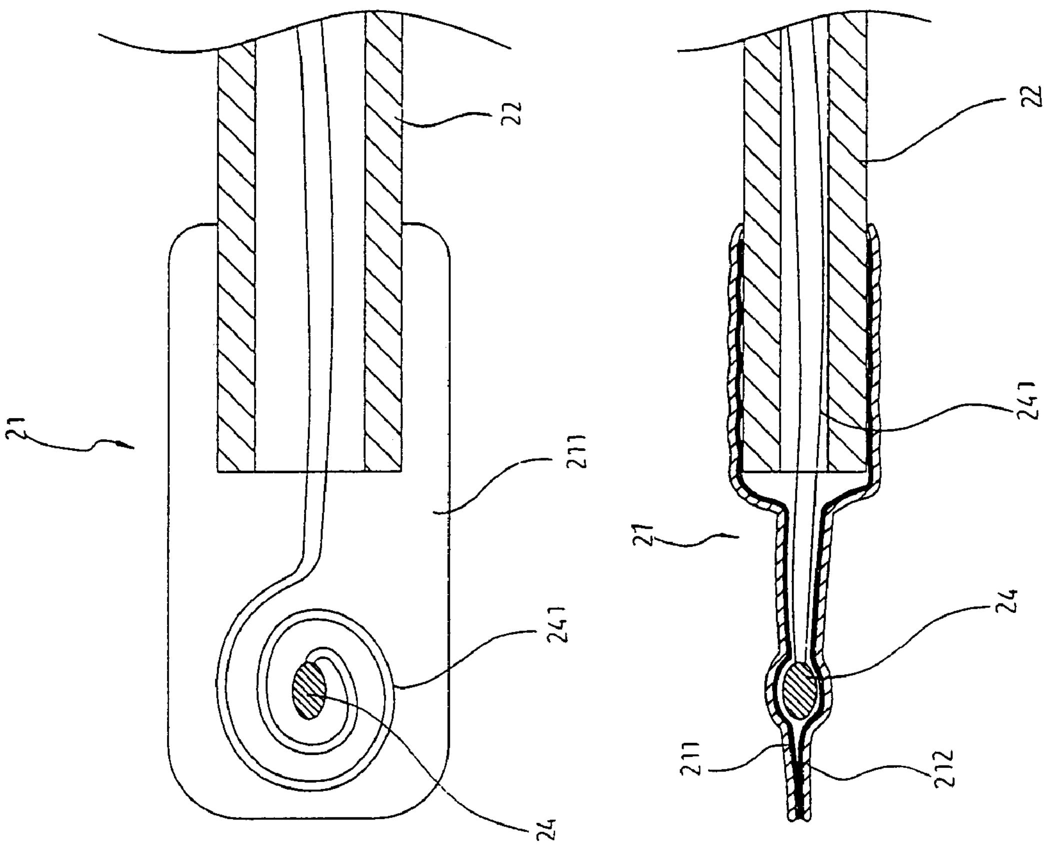
FIG. 11 is a schematic view of the measuring probe according to the present invention.
Figure 12:
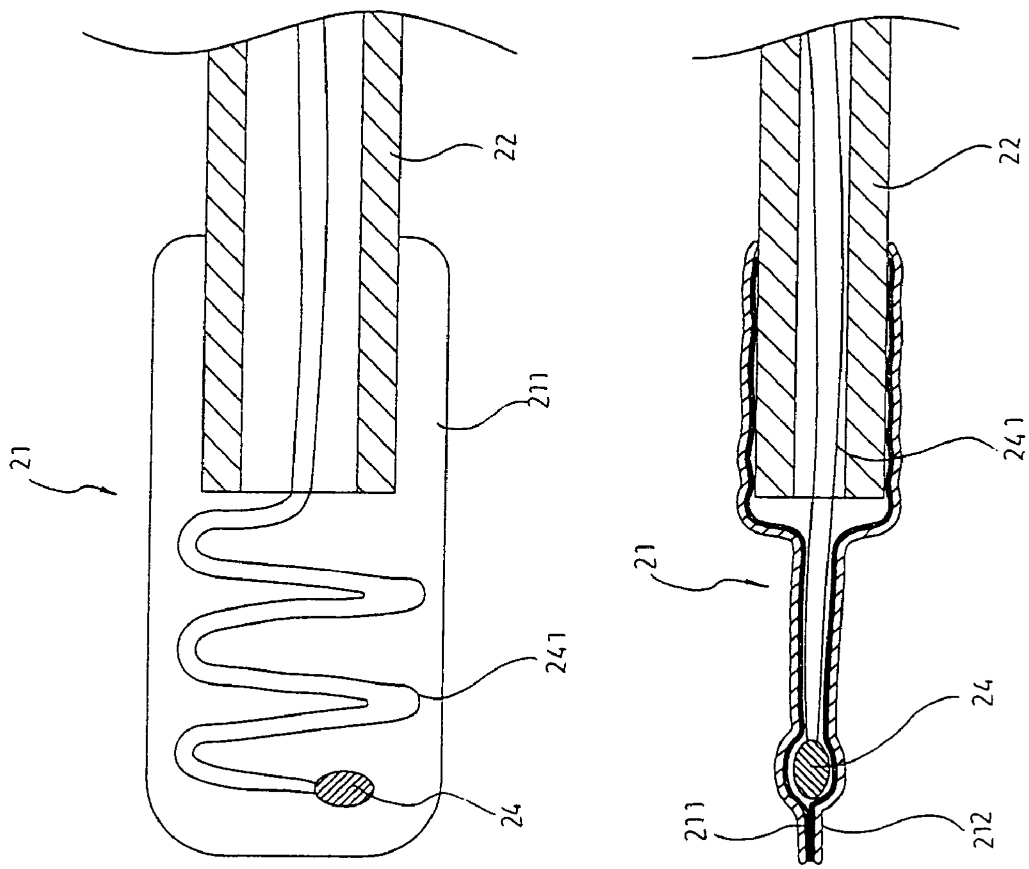
FIG. 12 is a schematic view of the measuring probe of another preferred embodiment according to the present invention.

As shown in FIGS. 11, 12, the measuring probe 21 can be made of stacked metal films (such as aluminum foil) 211, 212 with good conductivity. At this instance, the temperature sensor 24 and a part of the conductive wire 241 are positioned between the metal firms 211, 212 and the conductive wire 241 can be concentrically coiled or arranged into a wave shape.

The electronic clinical thermometer according to the present invention comprises two detachable modules, wherein one of the detachable modules such as the measuring body has an incomplete electronic clinical thermometer circuit lacking at least two elements, and these electronic elements are mounted within the other module such as the measuring probe, so that the two modules when attached together form a complete clinical thermometer.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. An electronic clinical thermometer comprising:

a measuring body including a power switch, a display and an incomplete temperature-measuring circuit lacking at least two electronic elements and being controlled by an integrated circuit;

a temperature sensing device including a measuring probe, a temperature sensing section, a connection seat and at least two electronic elements which are not present in said measuring body; and a connection structure mounted between said measuring body and said temperature-sensing device and being a conductive member;

said electronic elements not present in said measuring body being a reference resistor and a temperature sensor;

wherein said connection structure is positioned between said measuring body and said temperature sensing device, said connection structure comprising a cap for keeping a plurality of resilient conductive members on said circuit, said resilient conductive members protruding partially out of said cap, a sliding slot formed on said connection seat for mounting a control board having one side being connected to said conductive wire of said temperature sensor, said control board being provided with metal contacts for the mounting of said reference resistor;

whereby when said measuring body is connected with said temperature sensing device via said connection structure, said incomplete electronic clinical thermometer circuit of said measuring body will be connected to said electronic elements of said temperature sensing device to form an effective and complete temperature measuring circuit.

2. The clinical thermometer of claim 1, wherein said measuring body comprises a top cover and a bottom cover made from hard plastic material, a front section of said bottom cover being formed with a slot on a top and a recess on a bottom, and two lateral sides of said front section of said bottom cover being each formed with an engaging block.

3. The clinical thermometer of claim 1, wherein the measuring body is provided with a battery cover and contains flexible or rigid circuit board circuit on which are mounted said power switch, said display, a buzzer, and a light generator.

4. The clinical thermometer of claim 1, wherein said connection seat is a hollow member provided at a top with a notch and at two lateral sides with an engaging slot which is configured to engage with an engaging block of a bottom cover, an inner side of a top front portion of said connection seat having a protuberance adapted to engage with a slot of said bottom cover.

5. The clinical thermometer of claim 1, wherein said measuring probe is made of stacked metal films with good conductivity, said temperature sensor and a part of a conductive wire being positioned between said stacked metal films, and said conductive wire is concentrically coiled or arranged into a wave shape.

* * * * *